(12) United States Patent
Wilkinson et al.

(10) Patent No.: US 12,001,198 B2
(45) Date of Patent: Jun. 4, 2024

(54) SENSOR DEVICE

(71) Applicant: Woodside Energy Technologies Pty Ltd, Perth (AU)

(72) Inventors: Benjamin Wilkinson, Scarborough (AU); Thomas Chaney, Claremont (AU); Ryan Tripodi, Canning Vale (AU)

(73) Assignee: Woodside Energy Technologies Pty Ltd, Perth (AU)

( * ) Notice: Subject to any disclaimer, the term of this patent is extended or adjusted under 35 U.S.C. 154(b) by 397 days.

(21) Appl. No.: 17/221,781

(22) Filed: Apr. 3, 2021

(65) Prior Publication Data

US 2021/0223763 A1     Jul. 22, 2021

Related U.S. Application Data

(63) Continuation of application No. PCT/AU2019/051078, filed on Oct. 4, 2019.

(30) Foreign Application Priority Data

Oct. 4, 2018   (AU) .................... 2018903750

(51) Int. Cl.
   *G05B 19/406*    (2006.01)
   *G05B 23/02*     (2006.01)
   *H04W 4/70*      (2018.01)
(52) U.S. Cl.
   CPC ....... *G05B 23/0205* (2013.01); *G05B 19/406* (2013.01); *H04W 4/70* (2018.02)
(58) Field of Classification Search
   CPC .... G05B 23/0205; G05B 19/406; H04W 4/70
   (Continued)

(56) References Cited

U.S. PATENT DOCUMENTS 5,907,491 A * 5/1999 Canada .............. G05B 19/4065
                                                    702/182
6,604,013 B1   8/2003 Hamidieh et al.
(Continued)

FOREIGN PATENT DOCUMENTS

EP       1000350 B1    4/2003
JP    2009-171497 A    7/2009
(Continued)

OTHER PUBLICATIONS

How to build a Reed Switch circuit (Year: 2014).*
(Continued)

*Primary Examiner* — Mohamed Charioui
*Assistant Examiner* — Dacthang P Ngo
(74) *Attorney, Agent, or Firm* — Edell, Shapiro & Finnan, LLC (57) ABSTRACT

A sensor device includes a sensor arranged to produce time domain data representative of a sensed time dependent characteristic adjacent the sensor, and a signal processing component. The signal processing component is arranged to use the time domain data to produce frequency domain data indicative of frequency components present in the time domain data. The sensor device also includes a data transmission component arranged to transmit at least a portion of the frequency domain data. The sensor device is arranged to select a subset of frequency domain data corresponding to a defined number of highest peaks in the frequency domain data and to transmit the selected subset of frequency domain data.

37 Claims, 7 Drawing Sheets

(58) Field of Classification Search
USPC .......................................................... 702/77
See application file for complete search history.

(56) References Cited

U.S. PATENT DOCUMENTS

| 2003/0125890 | A1 | 7/2003 | Nagamatsu |
| 2009/0276189 | A1 | 11/2009 | Willen et al. |
| 2010/0008515 | A1 | 1/2010 | Fulton et al. |
| 2017/0181098 | A1* | 6/2017 | Shinohara ......... H04W 52/0261 |

FOREIGN PATENT DOCUMENTS

| JP | 2017/117089 A | 6/2017 |
| JP | 6328733 B1 | 5/2018 |
| WO | 1997/043729 A1 | 11/1997 |
| WO | 9743729 A1 | 11/1997 |

OTHER PUBLICATIONS

Application of compressed sensing in effective power consumption (Year: 2015).*
ITU, Technical and Operational aspect of low-power wide area network (Year: 2018).*
Ram, Prashant, "LPWAN, LR, LoRaWAN and the Internet of Things", Published in Coinmonks—Medium, https://medium.com/coinmonks/lpwan-lora-lorawan-and-the-internet-of-things-aed7d5975d5d, Aug. 7, 2018, 26 pages.
International Search Report, PCT/AU2019/051078, dated Dec. 18, 2019, 4 pages.
Australian Patent Office International Type Search Report, Application No. 2018903750, dated May 8, 2019, 24 pages.
International Preliminary Report on Patentability, PCT/AU2019/051078, dated Sep. 4, 2020, 5 pages.
English Translation of Office Action in counterpart to Japanese Application No. 2021-518781, dated Aug. 21, 2023, 5 pages.

* cited by examiner

SENSOR DEVICE

CROSS-REFERENCE TO RELATED APPLICATIONS

This application is a continuation of PCT/AU2019/051078, filed Oct. 4, 2019, which claims priority from AU 2018903750, filed Oct. 4, 2019, the disclosures of which are incorporated herein by reference in their entireties.

FIELD OF THE INVENTION

The invention relates to a sensor device for sensing operational characteristics of a component in an industrial facility, such as a vibration and a temperature characteristic of a component in an LNG plant, to a sensor network that includes a plurality of such sensor devices, and to a method of sensing operational characteristics of a component in an industrial facility.

BACKGROUND

It is known to provide a sensor device for sensing an operational characteristic, such as vibration and temperature, of a component in an industrial facility, and typically such a sensor device is arranged to communicate captured temperature and vibration signals to a remote facility for analysis. Typically, such devices use conventional cabling, or wireless communication arrangements for example based on 802.11x, LTE or 802.15.4 protocols, to communicate the signals, at least in the vicinity of the industrial facility.

Existing sensor devices for sensing operational characteristics are typically required to be relatively sophisticated because the amount of captured data that is required to be communicated is large. Existing sensor devices also tend to be expensive and tend to consume relatively large amounts of power to the extent that the devices have a life span of the order of 2 years, and in some instances several months, which is a significant burden in an industrial facility because a large number of sensor devices are typically used In addition, conventional communication cabling and communication devices based on 802.11x, LTE or 802.15.4 protocols are expensive to the extent that provision of sensor devices in an industrial facility becomes cost prohibitive because of the infrastructure required to support a large number of devices.

Furthermore, wireless communication arrangements based on protocols such as 802.11x have a relatively high carrier frequency (typically 2.4 GHz), and associated limited range (typically less than 100 m) and low penetration characteristics through obstacles, particularly metallic obstacles. This is highly undesirable in a typical industrial facility that includes many metallic obstacles.

Existing sensor devices for sensing an operational characteristic of a component in an industrial facility are therefore expensive, inefficient and problematic to implement.

SUMMARY

In accordance with a first aspect of the present invention, there is provided a sensor device comprising:
- a sensor controlled to produce time domain data representative of a sensed time dependent characteristic adjacent the sensor;
- a signal processing component, the signal processing component arranged to use the time domain data to produce frequency domain data indicative of frequency components present in the time domain data;
- a data transmission component arranged to transmit a portion of the frequency domain data using a LPWAN protocol; and
- a power manager arranged to control provision of power to at least one component of the sensor device according to power management criteria, the power management criteria defining wake up and sleep times whereby power to the at least one sensor device component is caused to be connected during wake time and power to the at least one sensor device component is caused to be disconnected during sleep time;
- wherein during each wake time the sensor device is arranged to:
    - select a subset of frequency domain data from the frequency domain data according to the amount of data that can be included in a single data packet: and
    - transmit the selected subset of frequency domain data in the single data packet;
- wherein only one data packet is transmitted during each wake time.

In an embodiment, the selected subset of frequency domain data corresponds to a defined number of frequency peaks in the frequency domain data.

In an embodiment, the selected subset of frequency domain data corresponds to a defined number of the highest frequency peaks in the frequency domain data.

In an embodiment, the selected subset of frequency domain data corresponds to the highest 33 frequency peaks in the frequency domain data.

In an embodiment, the sensor device is also arranged to transmit other data in addition to the selected subset of frequency domain data.

In an embodiment, the amount of other data is determined according the amount of data that can be included in a single data packet.

In an embodiment, the other data includes any one or more of the following:
- maximum peak acceleration amplitude;
- minimum peak acceleration amplitude;
- mean acceleration amplitude;
- time domain acceleration crest factor;
- frequency domain rms value;
- frequency domain positive peak mean value;
- frequency domain negative peak mean value;
- peak velocity data values derived by integrating the acceleration frequency domain data, for example wherein each velocity value is the or one of several maximum values in a bin of a set of bins; and/or
- turning speed of a rotatable part of a component to which the sensor is attached.

In an embodiment, the sensor is arranged to produce time domain vibration data representative of vibrations adjacent the vibration sensor.

In an embodiment, the sensor is arranged to produce time domain acceleration data, time domain velocity data and/or time domain displacement data.

In an embodiment, the LPWAN protocol is a LoRaWAN protocol.

In an embodiment, the sensor device includes an external memory separate to the signal processing component and the data transmission component, the sensor device arranged to store the time domain data in the external memory and to load the time domain data into the signal processing component for processing. The sensor device may be arranged to load successive portions of the time domain data into the signal processing component so that the time domain data can be processed in several batches.

In an embodiment, the selected subset of frequency domain data is selected from a defined frequency band.

The at least one sensor device component may comprise the sensor, at least one sensor port, an external memory separate to the signal processing component and the data transmission component, and/or a reprogramming port.

In an embodiment, the sensor device includes at least one power switch responsive to an activation signal from the power manager, the power switch arranged to cause power to be provided to at least one of the sensor device components in response to the activation signal and to cause power to not be provided to at least one of the sensor device components in absence of the activation signal. The at least one power switch may comprise at least one FET that may be a MOSFET.

In an embodiment, the power manager is arranged to control transmission of frequency domain data by the data transmission component according to defined criteria so as to control usage of the data transmission component.

In an embodiment, the power manager is arranged to progressively fill a buffer with data until the amount of data in the buffer is sufficient to fill a payload of a data packet used by the data transmission component, and to cause the data in the buffer to be sent by the data transmission component when sufficient data is present in the buffer.

In an embodiment, the power manager is arranged to send the data irrespective of whether there is sufficient data to fill a data packet if at least one defined criterion is met.

The at least one defined criterion may include a maximum and/or minimum permissible value associated with a sensor, and the power manager may be arranged such that if a current value associated with the sensor exceeds the maximum or minimum value, the current value is transmitted.

The at least one defined criterion may include a maximum permissible difference value associated with a sensor, the permissible difference value representing a difference amount between a current value and a corresponding previous value, and the power manager arranged such that if a current difference value exceeds the maximum difference value, the current value is transmitted.

In an embodiment, the sensor device is arranged to transmit a heartbeat communication to indicate that a monitored component is operating as expected based on received sensor values, and to send frequency domain data if the at least one defined criterion is met.

In an embodiment, the signal processing component is arranged to carry out a fast Fourier transform (FFT) process to produce FFT data using the time domain data.

The sensor device may comprise a sampler arranged to produce time domain data samples, the signal processing component arranged to use the time domain data samples to produce frequency domain data indicative of frequency components present in the time domain samples.

In an embodiment, the sensor device comprises at least one further sensor, the data transmission component arranged to transmit at least a portion of sensor data derived from the at least one further sensor. The at least one further sensor may include a temperature sensor.

In an embodiment, the sensor comprises an accelerometer that may be arranged to sense vibrations in 3 mutually orthogonal axes.

In an embodiment, the accelerometer is arranged to produce time domain data indicative of acceleration, velocity or displacement.

In an embodiment, the sensor device includes a processor that may form part of a system on chip (SoC) device, the SoC device including the data transmission component.

In an embodiment, the sensor device comprises a decoder to multiplex between data inputs of the SoC device and components of the sensor device.

In an embodiment, the sensor device includes a machine-readable code indicative of a unique identifier associated with the sensor device. The machine-readable code may include a QR code.

In an embodiment, components of the sensor device are encapsulated such that the components are isolated from ambient conditions.

In an embodiment, the sensor device includes an intrinsically safe switch arranged to control provision of power from a battery to all electrical components of the sensor device. The intrinsically safe switch may include a reed switch and a magnet that is receivable in a recess disposed adjacent the reed switch, wherein when the magnet is not received in the recess, the reed switch is closed, and when the magnet is received in the recess, the magnetic force provided by the magnet causes the reed switch to open.

In an embodiment, the sensor device comprises at least one magnetic portion, such as a magnetic foot, for attaching the sensor device to an industrial facility component.

In accordance with a second aspect of the present invention, there is provided a sensor network comprising:
    a plurality of sensor devices according to the first aspect of the present invention;
    a communications network capable of facilitating data transmissions from the data transmission components of the sensor devices; and
    a remote facility in network communication with the plurality of sensor devices through the communications network such that the data transmissions from the data transmission components are receivable at the remote facility.

In accordance with a third aspect of the present invention, there is provided a method of sensing an operational characteristic of a component using a sensor device, the method comprising:
    disposing the sensor device on the component;
    providing the sensor device with a sensor;
    controlling the sensor device to produce time domain data representative of a sensed time dependent characteristic adjacent the sensor;
    using a signal processing component of the sensor device to produce frequency domain data using the time domain data, the frequency domain data indicative of frequency components present in the time domain data;
    controlling provision of power to at least one component of the sensor device according to power management criteria, the power management criteria defining wake up and sleep times whereby power to the at least one sensor device component is caused to be connected during wake time and power to the at least one sensor device component is caused to be disconnected during sleep time; and
    during each wake time, the method comprises:
        selecting a subset of frequency domain data from the frequency domain data according to the amount of data that can be included in a single data packet; and
        using a LPWAN protocol, transmitting the selected subset of frequency domain data in the single data packet using a data transmission component of the sensor device;

wherein only one data packet is transmitted during each wake time.

BRIEF DESCRIPTION OF THE DRAWINGS

The present invention will now be described, by way of example only, with reference to the accompanying drawings, in which.

DETAILED DESCRIPTION

Figure 1:
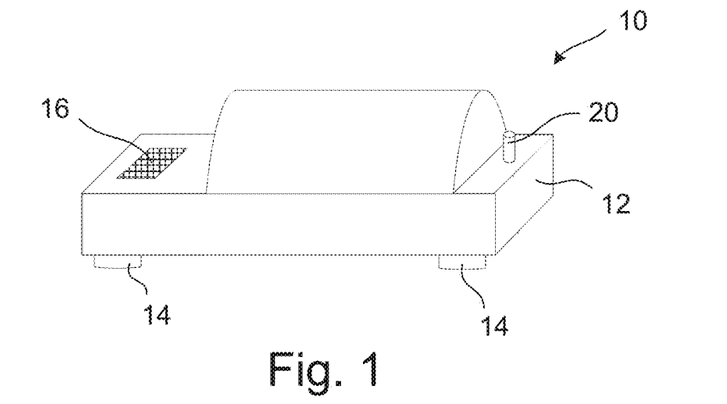
FIG. 1 is a diagrammatic representation of a sensor device in accordance with an embodiment of the present invention.

Referring to the drawings, in FIG. 1 there is shown a sensor device 10 suitable for use in an industrial facility to obtain operational characteristics of a component in the industrial facility, in this example vibration and temperature characteristics of a component in an LNG plant. Such components may include, for example, components that incorporate at least one moving part including compressors, pumps, motors and fans; heat exchangers; switch gear; and structural monitoring devices. Other operational characteristics may in addition or alternatively be obtained, including velocity and/or displacement of a component.

The sensor device 10 includes a housing 12 that encapsulates components of the sensor device such that the components are isolated from ambient conditions, and a plurality of feet 14, in this example 4, that in this example are magnetic to facilitate magnetic attachment of the sensor device 10 to a component in the industrial facility that has a characteristic desired to be monitored. As an alternative to magnetic attachment, it will be understood that the sensor device 10 may be attached to an industrial facility component in any other way, for example using cable ties.

In this example, identification indicia is disposed on the housing 12 to uniquely identify the sensor device, for example as part of a commissioning process wherein it is desirable to associate the sensor device 10 with the particular industrial facility component that the sensor device will monitor. In this example, the identification indicia include a machine-readable code such as a QR code 16.

Figure 2:
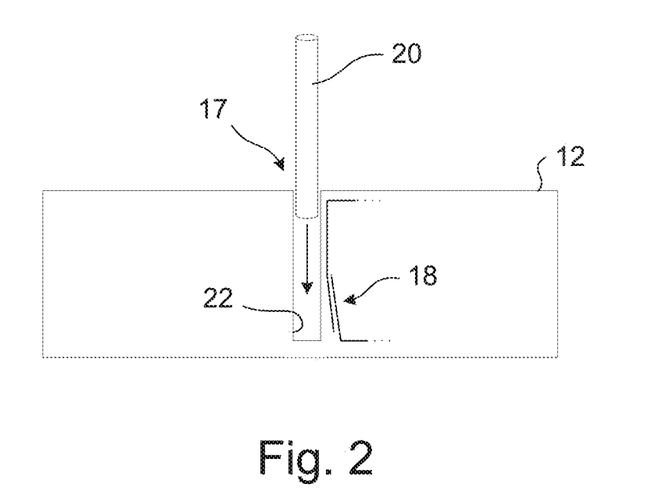
FIG. 2 is a diagrammatic cross-sectional view of the sensor device of FIG. 1 showing an intrinsically safe switch.

The sensor device 10 also includes an intrinsically safe switch 17 that serves to activate or deactivate the sensor device by connecting power to or disconnecting power from components of the sensor device 10. In this example, the intrinsically safe switch 17 includes a reed switch 18 and an elongate magnet 20 that is receivable in an elongate recess 22 disposed adjacent the reed switch 18. The arrangement is such that when the magnet 20 is not received in the recess 22, the reed switch 18 is closed, and when the magnet 20 is received in the recess 22, the magnetic force provided by the magnet causes the reed switch 18 to open.

It will be understood that the intrinsically safe switch 17 enables the sensor device components to remain encapsulated and isolated from ambient whilst providing an effective arrangement for activating and deactivating the sensor device by a user.

In an alternative arrangement, instead of using the reed switch 18 and magnet 20 to facilitate activation and deactivation of the sensor device, the sensor device may include a mechanical switch and a MOSFET, for example with the switch current limited using resistors of a voltage divider.

Figure 3:
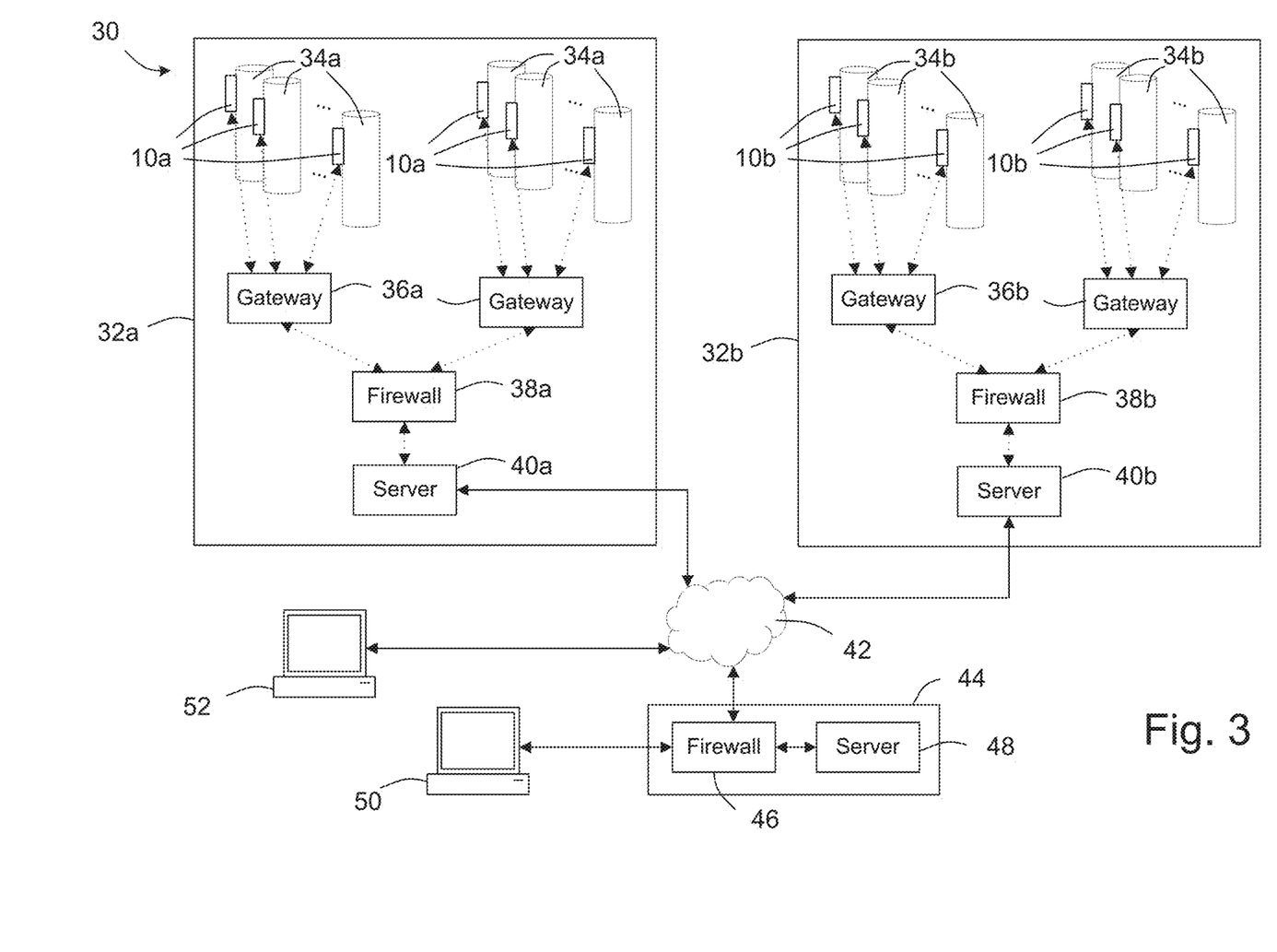
FIG. 3 is a diagrammatic representation of a sensor network according to an embodiment of the present invention, the sensor network including multiple sensor devices shown in FIGS. 1 and 2.

A sensor network 30 showing a plurality of sensor devices 10a, 10b disposed at multiple industrial facilities, in this example 2 industrial facilities 32a, 32b, is shown in FIG. 3.

Each industrial facility 32a, 32b includes multiple industrial facility components 34a, 34b, each of which has an associated sensor device 10a, 10b attached to the industrial facility component, in this example using the magnetic feet 14.

Each sensor device 10a, 10b communicates with a gateway 36a, 36b arranged to receive wireless communications from multiple sensor devices 10a, 10b and to communicate wirelessly with a local server 40a, 40b, in this example through a firewall 38a, 38b. Each local server 40a, 40b then communicates, for example in a conventional way, through a wide area network such as the Internet 42 with a common remote analysis facility 44 that for example may be used to analyse data received from the sensor devices 10a, 10b.

In this example, the analysis facility 44 includes a firewall 46 and a remote server 48 accessible either directly by a local terminal 50 or remotely, for example through the Internet 42, by a remote terminal 52.

The communications network at each industrial facility 32a, 32b is configured according to a low power wide area network (LPWAN) that is arranged to facilitate long range communications at low power (but at a low bit rate). LPWAN typically has a range up to 10 km, has a bit rate of about 0.3 kbit/s to 50 kbit/s per channel, and LPWAN based devices can typically operate for 10 years or more before battery replacement is required. In the present example, a low power, long range, readily scalable LoRaWAN wireless communication network protocol is used, although it will be understood that other LPWAN protocols may be used.

LoRaWAN in Australia operates using a 915-930 MHz carrier frequency. A communications network using the LoRaWAN protocol is capable of communicating over distances of the order of 16 km and LoRaWAN signals more readily travel through a dense, metallic environment than for example 802.11x protocol signals. In addition, the LoRaWAN protocol uses spread signal chirp technology that allows thousands of nodes to be connected to each gateway, which provides a network that is highly scalable compared to, for example, 802.11x, LTE and 802.15.4 protocols.

In addition, since a device that uses a LPWAN protocol uses significantly less power than a device that uses for example an 802.11x, LTE or 802.15.4 protocol, the power consumption of the present sensor devices 10a, 10b is significantly less than related sensor devices known hitherto.

Furthermore, since components of a communications network that uses a LPWAN protocol are significantly less expensive than components required for an 802.11x, LTE or 802.15.4 network, the present sensor devices 10a, 10b are significantly less expensive than related sensor devices known hitherto.

However, since LPWAN uses a significantly lower frequency than for example 802.11x, the bandwidth available to the sensor device 10 to transmit data is significantly reduced relative to 802.11x.

Figure 4:
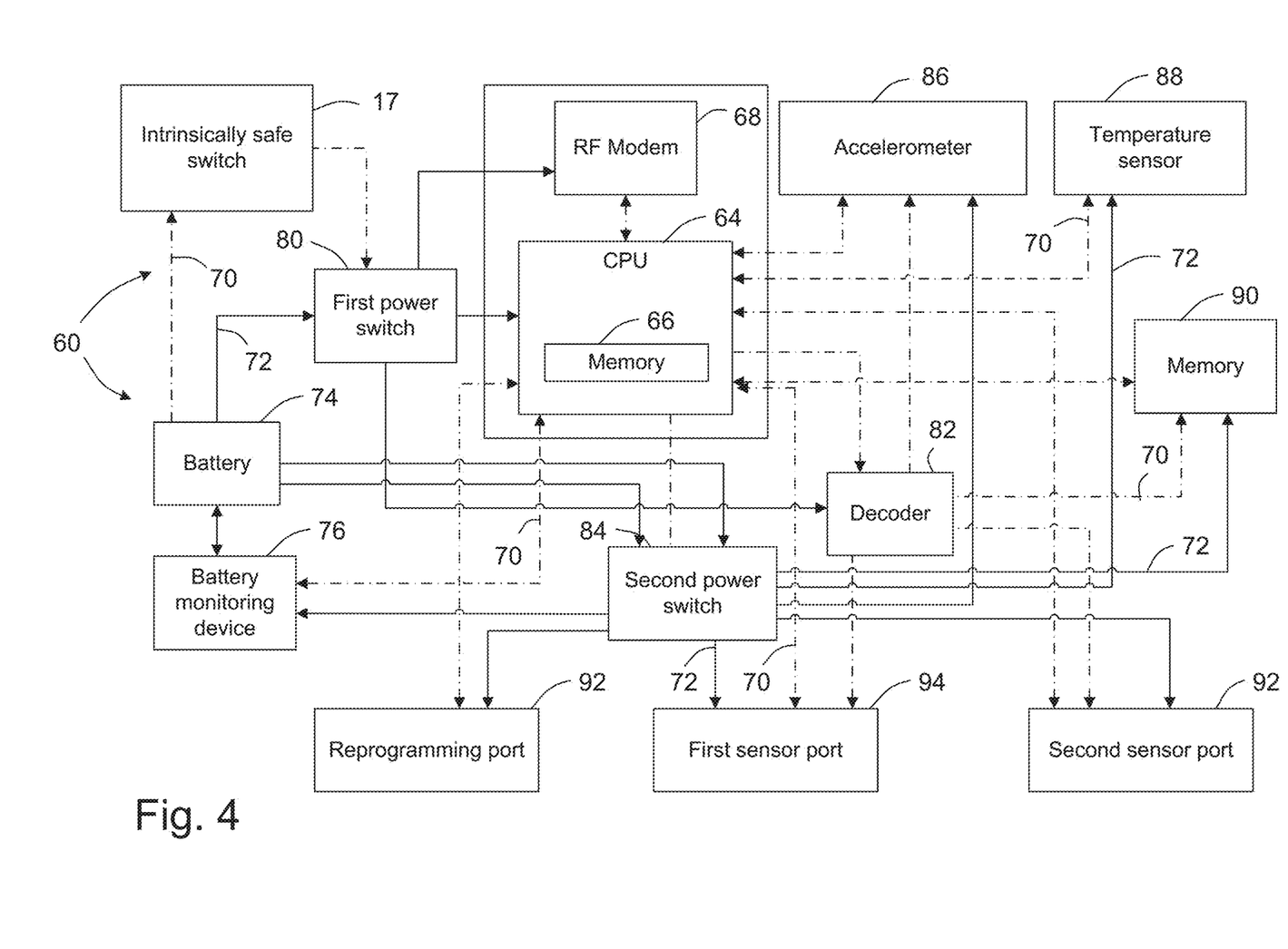
FIG. 4 is a block diagram illustrating components of the sensor device shown in FIGS. 1 and 2.

Referring to FIG. 4, components 60 of the sensor device 10 are shown. Interconnections between the components 60 include data connections 70 and power connections 72.

The components 60 include a communications system on a chip (SoC) device 62 that has a processor 64 and associated internal memory 66, and a radio frequency modem 68 arranged to wirelessly send RF signals to and wirelessly receive RF signals from a gateway 36. In this example, the SoC device 62 is a Multitech xDot device that includes an Arm Cortex 3 microcontroller, although it will be understood that any suitable SoC device is envisaged.

A SoC was selected that has very low power usage characteristics, but a consequence of this is that the amount of internal memory 66 is too small to handle the desired number of vibration data samples. For this reason, external memory 90 is also included.

The components 60 include a battery 74 that in this example is a 3.7V battery, and a battery monitoring device 76 arranged to monitor the battery voltage and for example to send a communication indicative of the battery voltage, for example periodically, to the analysis facility 44.

The components 60 also include the intrinsically safe switch 17 arranged to control communication of an activation signal to a first power switch 80 that in response to receipt of the activation signal provides power from the battery 74 to the processor 64, the RF modem 68 and a decoder 82.

In this example, the first power switch 80 comprises a FET device such as a MOSFET.

Similarly, a second power switch 84 is responsive to an activation signal from the processor 64 such that in response to receipt of the activation signal, the second power switch 84 provides power from the battery 74 to an accelerometer 86, a temperature sensor 88, an external memory 90, a reprogramming port 92, a first sensor port 94 and a second sensor port 96.

In this example, the second power switch 84 comprises a FET device such as a MOSFET.

It will be understood that while the SoC device 62 has very low inherent power usage characteristics, the power usage profile of the sensor device 10 is maintained at a low level by actively removing power from components of the sensor device 10 using the second power switch 84 when the components are not being used.

Based on the type of selected SoC device 62 and the power management arrangements of the sensor device 10, it is envisaged that the present sensor device 10 will have a productive life of the order of 10 years.

The decoder 82 is included so that the effective number of ports connected to the SoC device 62 can be increased, the decoder 82 functioning as a multiplexer between data inputs of the SoC device 62 and the accelerometer 86/the external memory 90/the first sensor port 94/and the second sensor port 96. The decoder 82 may use a Chip Select control line of the processor 64 to control the multiplexing function of the decoder 82.

The accelerometer 86 is arranged to sense vibrations and to generate a signal indicative of the vibrations. In this example, the accelerometer 86 senses vibrations in 3 mutually orthogonal axes and produces 3 signals indicative of x, y and z orthogonal vibrations. The signals indicative of the vibrations may be signals indicative of acceleration, velocity and/or displacement, in this example in 3 mutually orthogonal directions.

In this example, the accelerometer 86 is an ADXL345 MEMS based accelerometer, although it will be understood that any suitable accelerometer is envisaged.

Data indicative of the raw vibration signals received from the accelerometer 86 is, under control of the processor 64, temporarily stored in the external memory 90, the vibration data being subsequently loaded into the processor internal memory 66 so that a fast Fourier transform (FFT) process can be carried out on the vibration data by the processor 64. In this example, the FFT process carried out is based on about 65,536 vibration data points obtained by sampling the raw vibration signals produced by the accelerometer 86.

It will be understood that on-board FFT analysis by the sensor device 10 is necessary because the bandwidth associated with the LPWAN, in this example LoRaWAN, protocol is low to the extent that it would not be possible to transmit the large amount of sampled vibration data, but the bandwidth is sufficient to transmit data indicative of the results of the FFT analysis. Accordingly, implementation of the FFT analysis on the sensor device 10 enables an information rich relatively small data set to be transmitted. In this example, the transmitted data set is of the order of 200 bytes as this is the size of a LoRaWAN packet payload.

In this example, the temperature sensor 88 is a DS18620 temperature sensor, although it will be understood that any suitable temperature sensor is envisaged.

In this example, the external memory 90 is 4 Mb of SRAM, SRAM being used because SRAM is volatile and is capable of withstanding a large number of writes, unlike Flash memory, although it will be understood that any suitable external memory is envisaged.

The reprogramming port 94 is used to communicate directly with the sensor device 10, for example so as to reprogram the SoC device 62.

The first and second sensor ports 94, 96 are for connection to other sensors, for example an audio sensor.

Figure 5:
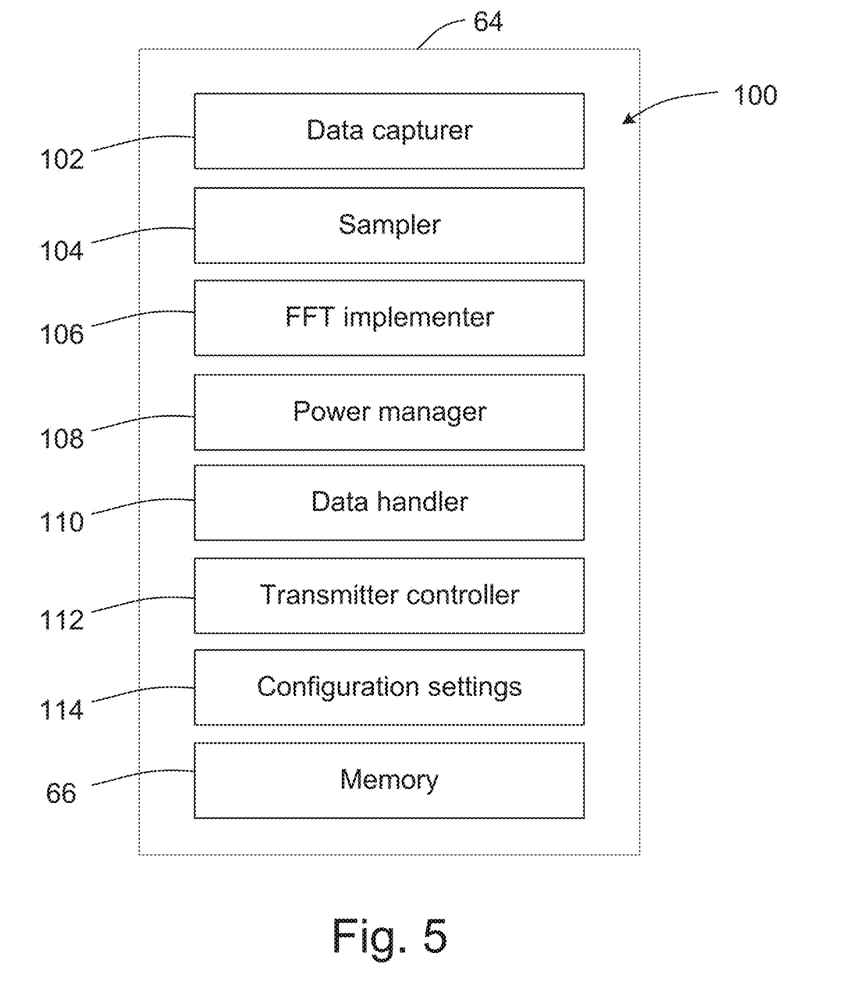
FIG. 5 is a diagrammatic representation of functional components of and functional components implemented by a processor of the sensor device shown in FIGS. 1 and 2.

Referring to FIG. 5, functional components 100 of or implemented by the processor 64 are shown. The processor 64 includes associated temporary memory 66 used to implement processes and temporarily store data. The processor 64 also implements processes, for example using programs stored in non-volatile memory (not shown).

The functional components 100 implemented by the processor 64 include:
- a data capturer 102 arranged to control and coordinate capture of data indicative of temperature from the temperature sensor 88, and to store the captured temperature data in the external memory 90;
- a sampler 104 arranged to control and coordinate capture of samples of vibration data from the accelerometer 86 and to store the samples in the external memory 90;
- a fast Fourier transform (FFT) implementer 106 arranged to implement a fast Fourier transform on the sampled vibration data to produce FFT vibration data and to store the FFT vibration data in the external memory 90;
- a power manager 108 arranged to manage power usage by the sensor device 10, in particular by managing supply of power to some of the sensor device components 60 using the second power switch 84;
- a data handler 110 arranged to manage transfer of data between the processor 64 and the external memory 90; and a transmitter controller 112 arranged to control the RF modem 68 and coordinate transmission and reception of data by the RF modem.

The functional components 100 also include configuration settings 114, for example that relate to:

timing of capture of data indicative of temperature from the temperature sensor 88;

timing of capture of samples of vibration data from the accelerometer 86 and sampling characteristics including the sampling rate;

FFT characteristics;

transmission data characteristics including characteristics that define the set of data derived from the FFT vibration data to be provided to the RF modem 68 for transmission; and power management characteristics, including sleep and wake times, and arrangements to minimise the number of transmissions carried out by the RF modem 68.

In this example, the settings define that the data indicative of temperature is captured periodically, such as every 15 minutes, although it will be understood that any suitable data capture timing regime is envisaged.

In this example, the settings define that the samples of vibration data are captured periodically, such as every 15 minutes, although it will be understood that any suitable data capture timing regime is envisaged. In this example, the sampling rate is about 3.2 kHz, although it will be understood that any suitable sampling rate is envisaged.

In this example, the FFT implementer 106 uses a Cooley-Tukey algorithm, although it will be understood that any suitable FFT algorithm is envisaged.

In this example, the set of data derived from the FFT vibration data for transmission by the RF modem 68 is selected based on a defined number of frequency peaks, for example the 33 highest frequency peaks in the FFT vibration data, although it will be understood that any suitable criterion may be used to select the set of data from the FFT vibration data for transmission. For example, the set of data may be selected based on a defined number of frequency peaks within a defined frequency band. Alternatively, the set of data for transmission may be based on defined criteria, such as all peaks above a defined value up to a maximum number of peaks.

In this example, after activation of the sensor device 10 by removal of the magnet 20 from the recess 22, power management of the sensor device 10 is controlled by the second power switch 84 based on the power management characteristics managed by the processor 64. The power management characteristics may define that power is provided to the accelerometer 86, the temperature sensor 88, the external memory 90, the reprogramming port 92, the first sensor port 94 and the second sensor port 96 only when an action is required to be carried out by any one of these components. For example, the power management characteristics may define that power is provided to the components when the configuration settings indicate that temperature and vibration data is required to be captured, and power is removed from the components after the temperature data and FFT vibration data are transmitted by the RF modem 68.

Figure 6A:
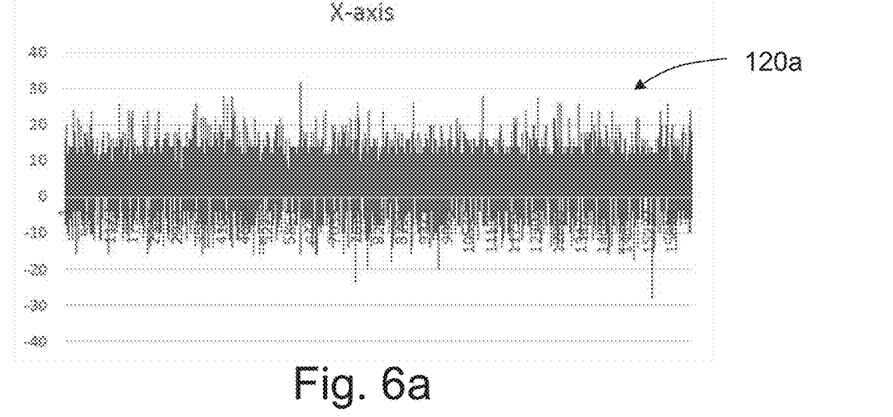
FIGS. 6a, 6b and 6c show raw sample vibration data captured from a 3-axis accelerometer.
Figure 6B:
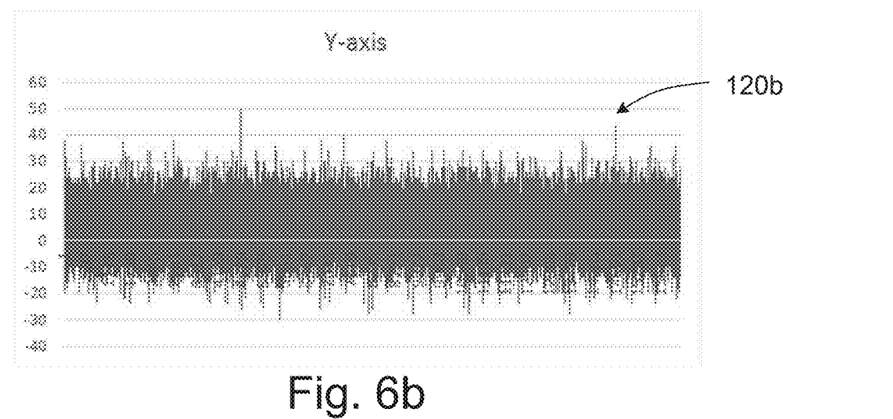
Figure 6C:
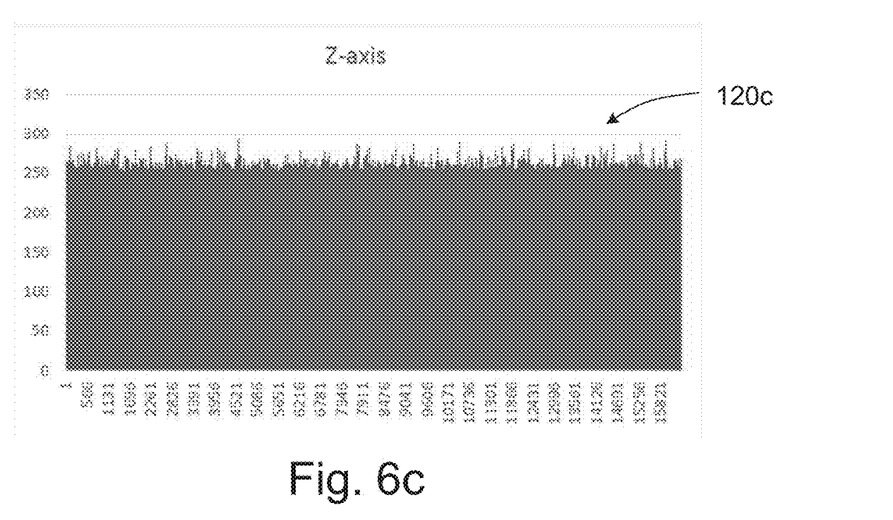
Figure 7:
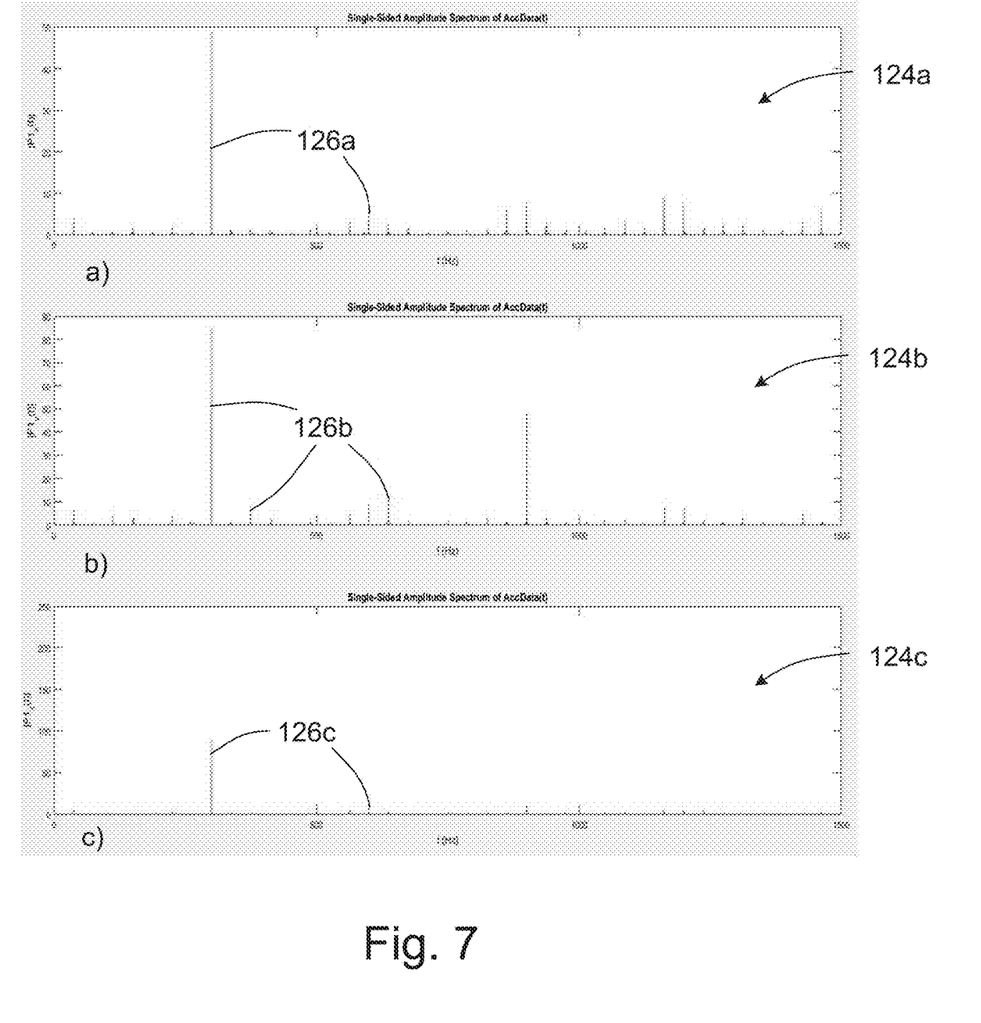
FIG. 7, broken into three graphs labelled (a), (b) and (c) (also referred to herein as FIGS. 7a, 7b and 7c) shows FFT data obtained from the raw sample vibration data shown in FIGS. 6a to 6c.

Examples of raw vibration data and FFT vibration data are shown in FIGS. 6 and 7.

FIGS. 6*a* to 6*c* show raw sample vibration data captured from the accelerometer 86. FIG. 6*a* shows raw sample vibration data in an x-axis, FIG. 6*b* shows raw sample vibration data in a y-axis, and FIG. 6*c* shows raw sample vibration data in a z-axis.

FIGS. 7*a* to 7*c* show FFT data obtained from the raw sample vibration data shown in FIGS. 6*a* to 6*c*. FIG. 7*a* shows FFT data in an x-axis, FIG. 7*b* shows FFT data in a y-axis, and FIG. 7*c* shows FFT data in a z-axis.

In this example, for each of the FFT x, y and z axis data, the data corresponding to the 33 highest peaks is selected and transmitted using the RF modem 68 to the remote analysis facility 44.

At the remote analysis facility 44, the received selected FFT data and received temperature data can be used to analyse the vibration and temperature characteristics of the monitored components 34, for example in order to determine whether any problems exist in relation to the components 34.

Depending on the type of sensor used, or depending on the configuration used for the sensor, the received FFT data may be indicative of acceleration, velocity or displacement.

It will be understood that the remote analysis facility 44 in this example is arranged to monitor operational characteristics of components 34 associated with multiple industrial facilities 32, and in this way by using appropriate software at the remote analysis facility 44, it is possible to develop useful data indicative of operational trends that may enable operators to improve aspects of the industrial facility.

The sensor device 10 is constructed in order to comply with IECEx certification requirements by including the following features:

encapsulating the sensor device components in a material that can tolerate temperatures generated by internal heat dissipation plus a factor of safety;

current limiting all external electronic elements using 40 ohm resistors;

including in the encapsulant material a 3.7V battery which is sufficient to power the device;

including in the encapsulant material an antenna;

ensuring that all unprotected internal circuit traces have a spacing of at least 0.5 mm.

In the present embodiment, in order to further minimise power usage, the sensor device 10 may be arranged to transmit the data based on defined criteria so that usage of the RF modem 68, which is a relatively high draw on power, is minimised. For example, rather than transmitting data immediately after data is collected, the power manager 108 may be arranged to maintain a buffer of data, for example implemented in the CPU 64, and to progressively fill the buffer until the amount of data in the buffer is sufficient to fill the payload of a LoRaWAN packet. After the required packet length has been achieved, the power manager 108 causes the data to be sent.

In the present embodiment, FFT vibration data is transmitted immediately after it is obtained, and temperature data is used to fill the buffer and is only sent when the buffer is full.

In a variation to this arrangement, the power manager 108 may nevertheless be arranged to send data as it is created if at least one defined criterion is met irrespective of whether there is sufficient data to fill a LoRaWAN packet.

For example, a record of maximum and minimum permissible temperature values may be stored and the power manager 108 arranged such that if detected temperature data values exceed the maximum or minimum values, the current temperature data is transmitted.

Similarly, a record of maximum permissible FFT vibration or temperature difference values may be stored, the permissible difference values representing difference amounts between the current values and corresponding previous values. With this example, the power manager 108 may be arranged such that if difference values exceed a maximum difference value, the current data is transmitted. In addition, with this arrangement, the sensor device 10 may be arranged to transmit a heartbeat communication if the difference threshold is not exceeded to indicate to the analysis facility 44 that the monitored component is operating as expected, with data only transmitted if the threshold is exceeded, to indicate that component characteristics have notably changed.

Figure 8:
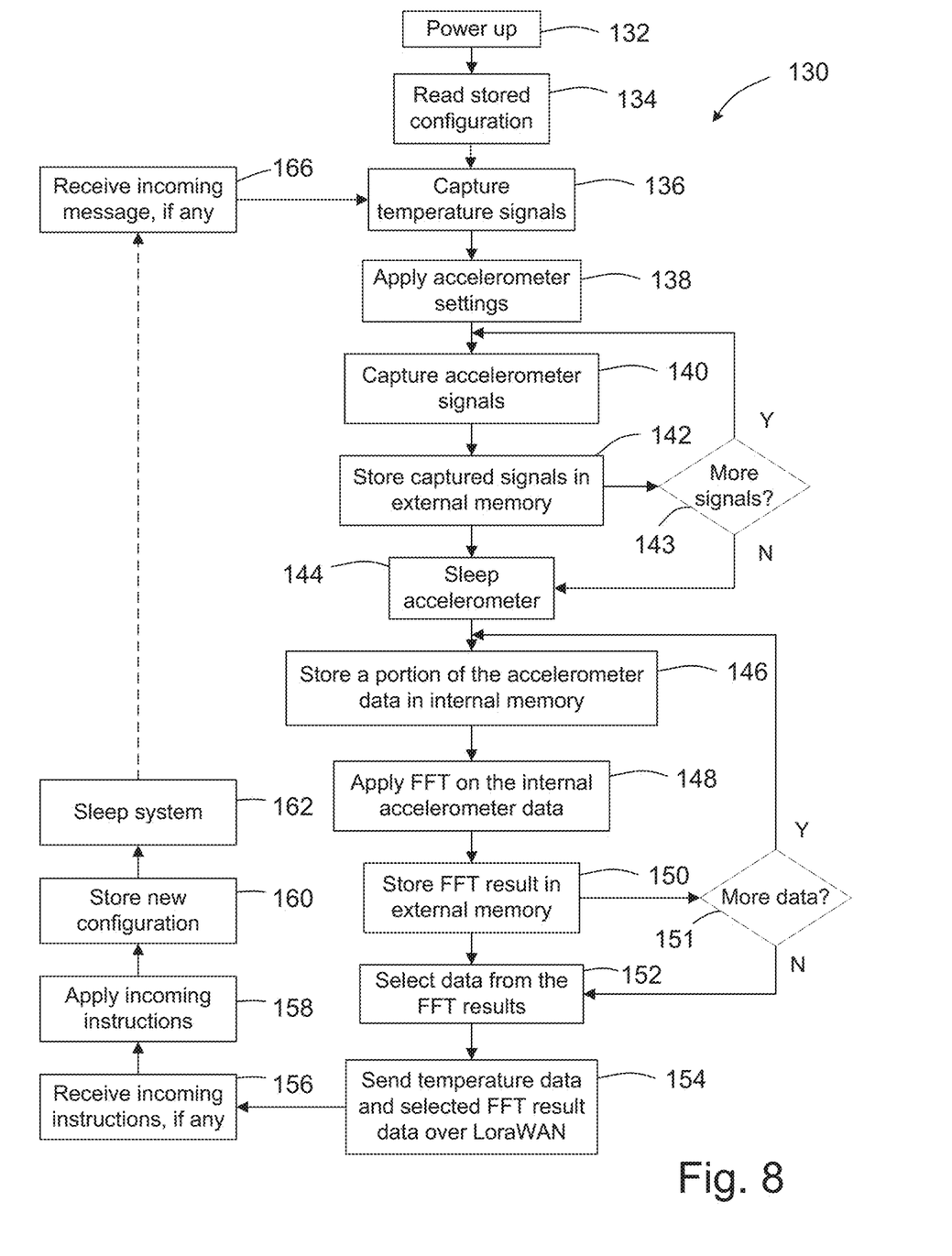
FIG. 8 is a flow diagram illustrating a process of operation of the sensor device shown in FIGS. 1 to 5.

Referring to FIG. 8, a flow diagram 130 illustrating an example process of operation of a sensor device 10 is shown.

Based on the data capture and power management configuration settings 114 that define a wake up time, the processor 64 sends an activation signal to the second power switch 84 to cause the sensor device 10 to wake 132, by causing power to be provided to the accelerometer 86, the temperature sensor 88, the external memory 90, the reprogramming port 92, the first sensor port 94 and the second sensor port 96. After waking, the processor 64 reads 134 the stored configuration settings 114 to determine the settings to use for capture of the temperature and vibration data from the temperature sensor 88 and the accelerometer 86, and using the settings the temperature data and samples of the raw 3-axis vibration data are obtained 136, 138, 140 and stored 142 in the external memory 90.

At least some of the components, of the sensor device 10, including the accelerometer 86, may include an input responsive to a sleep signal such that although power is still provided to the component, in response to receipt of the sleep signal, the component is placed in a sleep state so that the component uses less power.

In the present example, the accelerometer 86 is placed in a sleep state 144 after accelerometer signal have been captured.

The processor 64, using the data handler 110, loads 146 successive portions of the raw vibration data into the internal memory 66 from the external memory 90, and using the FFT implementer 106, carries out 148 a FFT process on the raw vibration data to produce FFT vibration data. The FFT vibration data is stored 150 in the external memory.

Using the stored FFT vibration data, data is selected 152 from the stored FFT data based on the defined FFT characteristics in the configuration settings 114, and the selected FFT data is transmitted to the remote analysis facility 44 using a LoRaWAN protocol by the RF modem 68.

After receipt of the selected FFT data from the sensor device 10 by the remote analysis facility 44, the remote analysis facility 44 may take the opportunity to send instructions to the sensor device 10 while the sensor device 10 is awake. For example, the instructions may include new configuration data to change sample times, wake/sleep times, sample rates, and so on, or the instructions may include instructions to reboot the sensor device 10. Any received new configuration data is stored 160, and based on the power management configuration settings 114 that define a sleep time, the processor 64 sends a deactivation signal to the second power switch 84 to cause the sensor device 10 to sleep 164 until the next scheduled wake time.

The above embodiments are described in relation to an arrangement wherein FFT frequency domain data is obtained from time domain vibration data, and a subset of the FFT data is selected for transmission by the RF modem 68, such as a defined number (such as 33) of the highest peaks in the frequency domain data. Such data may be sent in each LPWAN packet. For example, the LPWAN packet may comprise about 200 bytes that includes the data shown in the following table.

| Item | No. of bytes | Decimal places | Min value | Max value |
|---|---|---|---|---|
| Description | 1 | | | |
| 33 peaks (frequency & amplitude values) | 198 | | | |
| Each peak frequency (Hz) | 2 | 1 | 0 | 6500 |
| Each peak amplitude (m/s$^2$) | 4 | 5 | 0 | 42200 |

It will be understood that with this arrangement, after capture of data from the sensor 10, the data may typically be transmitted in a single LPWAN packet, and as a consequence power consumption by the sensor 10 is low. However, notwithstanding that data associated with each data capture instance is typically transmitted using a single LPWAN packet, in some circumstances more than one packet may be transmitted, depending on the data that is required to be sent.

In an alternative embodiment, the selected subset of FFT data may include a different number of the highest peaks, and/or a different number of bytes used to communicate the peak data. For example, the inventors have realised that 165 m/s$^2$ is a sufficiently high maximum value for acceleration amplitude in the frequency domain data, and consequently it is possible to use a lower number of bytes to represent the amplitude data in a LPWAN packet. Since with this example 3 bytes are used for the peak amplitude data instead of 4, it is possible to include in each LPWAN packet additional data that is derivable from the captured time domain vibration data because 1 bit is available in the LPWAN packet for each frequency peak in the data.

For example, a LPWAN packet may include data indicative of any one or more of the following:
maximum peak acceleration amplitude;
minimum peak acceleration amplitude;
mean acceleration amplitude;
time domain acceleration crest factor;
frequency domain rms value;
frequency domain positive peak mean value;
frequency domain negative peak mean value;
peak velocity data values derived by integrating the acceleration frequency domain data, for example wherein each velocity value is the or one of several maximum values in a bin of a set of bins; and/or
turning speed of a rotatable part of a component to which the sensor is attached.

An embodiment that transmits the above data may include a LPWAN packet that includes the data shown in the following table.

| Item | No. of bytes | Decimal places | Min value | Max value |
|---|---|---|---|---|
| Main Group | 198 | | | |
| Common Sub-Group | 26 | | | |
| Description | 1 | | | |
| 34 peaks (frequency & amplitude values) | 170 | | | |
| Each peak frequency (Hz) | 2 | 1 | 0 | 6500 |
| Each peak amplitude (m/s$^2$) | 3 | 5 | 0 | 165 |
| Common Sub-Group | | | | |
| Acceleration peak-peak (m/s$^2$) | 2 | 3 | 0 | 65 |
| Crest Factor | 2 | 3 | 0 | 65 |
| Velocity bin 1 (mm/s) | 2 | 3 | 0 | 65 |
| Velocity bin 2 (mm/s) | 2 | 3 | 0 | 65 |
| Velocity bin 3 (mm/s) | 2 | 3 | 0 | 65 |
| Velocity bin 4 (mm/s) | 2 | 3 | 0 | 65 |

-continued

| Item | No. of bytes | Decimal places | Min value | Max value |
|---|---|---|---|---|
| Velocity bin 5 (mm/s) | 2 | 3 | 0 | 65 |
| Velocity bin 6 (mm/s) | 2 | 3 | 0 | 65 |
| Velocity bin 7 (mm/s) | 2 | 3 | 0 | 65 |
| Turning Speed (Hz) | 2 | 2 | 0 | 650 |
| Acceleration rms | 2 | 3 | 0 | 65 |
| Acceleration positive peak | 2 | 3 | 0 | 65 |
| Acceleration negative peak | 2 | 3 | −65 | 0 |

It will therefore be understood that additional information is sent with this arrangement even though only a single LPWAN packet is still typically transmitted with each data capture instance.

However, it will be understood that any suitable data derivable at the sensor from the time domain and/or frequency domain data may be included in a LPWAN packet.

It is to be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

Modifications and variations as would be apparent to a skilled addressee are deemed to be within the scope of the present invention.

What is claimed:

1. A sensor device comprising:
a sensor controlled to produce time domain data representative of a sensed time dependent characteristic adjacent the sensor;
a signal processing component, the signal processing component arranged to use the time domain data to produce frequency domain data indicative of frequency components present in the time domain data;
a data transmission component arranged to transmit a portion of the frequency domain data using a low-power wide-area network (LPWAN) protocol; and
a power manager arranged to control provision of power to at least one component of the sensor device according to power management criteria, the power management criteria defining wake up and sleep times whereby power to the at least one sensor device component is caused to be connected during wake time and power to the at least one sensor device component is caused to be disconnected during sleep time;
wherein during each wake time, the sensor device is arranged to:
select a subset of frequency domain data from the frequency domain data according to the amount of data that can be included in a single data packet: and
transmit the selected subset of frequency domain data in the single data packet;
wherein only one data packet is transmitted during each wake time.

2. The sensor device of claim 1, wherein the selected subset of frequency domain data corresponds to a defined number of frequency peaks in the frequency domain data.

3. The sensor device of claim 2, wherein the selected subset of frequency domain data corresponds to a defined number of the highest frequency peaks in the frequency domain data.

4. The sensor device of claim 1, wherein the sensor device is also arranged to transmit other data in addition to the selected subset of frequency domain data.

5. The sensor device of claim 4, wherein the other data includes any one or more of the following:
maximum peak acceleration amplitude;
minimum peak acceleration amplitude;
mean acceleration amplitude;
time domain acceleration crest factor;
frequency domain rms value;
frequency domain positive peak mean value;
frequency domain negative peak mean value;
peak velocity data values derived by integrating the acceleration frequency domain data, for example wherein each velocity value is the or one of several maximum values in a bin of a set of bins; and/or
turning speed of a rotatable part of a component to which the sensor is attached.

6. The sensor device of claim 1, wherein the sensor is arranged to produce time domain vibration, acceleration, velocity and/or displacement data.

7. The sensor device of claim 1, wherein the data transmission component is arranged to use a long range wide area network (LoRaWAN) protocol.

8. The sensor device of claim 1, wherein the sensor device includes an external memory separate to the signal processing component and the data transmission component, the sensor device arranged to store the time domain data in the external memory and to load the time domain data into the signal processing component for processing.

9. The sensor device of claim 8, wherein the sensor device is arranged to load successive portions of the time domain data into the signal processing component so that the time domain data can be processed in several batches.

10. The sensor device of claim 1, wherein the selected subset of frequency domain data is selected from a defined frequency band.

11. The sensor device of claim 1, wherein the at least one sensor device component comprises the sensor, at least one sensor port, an external memory separate to the signal processing component and the data transmission component, and/or a reprogramming port.

12. The sensor device of claim 1, wherein the sensor device includes at least one power switch responsive to an activation signal from the power manager, the power switch arranged to cause power to be provided to at least one of the sensor device components in response to the activation signal and to cause power to not be provided to at least one of the sensor device components in absence of the activation signal.

13. The sensor device of claim 1, wherein the power manager is arranged to progressively fill a buffer with data until the amount of data in the buffer is sufficient to fill a payload of a data packet used by the data transmission component, and to cause the data in the buffer to be sent by the data transmission component when sufficient data is present in the buffer.

14. The sensor device of claim 13, wherein the power manager is arranged to send the data irrespective of whether there is sufficient data to fill a data packet if at least one defined criterion is met.

15. The sensor device of claim 14, wherein the at least one defined criterion includes a maximum and/or minimum permissible value associated with a sensor, and the power manager is arranged such that if a current value associated with the sensor exceeds the maximum or minimum value, the current value is transmitted.

16. The sensor device of claim 14, wherein the at least one defined criterion includes a maximum permissible difference value associated with a sensor, the permissible difference value representing a difference amount between a current value and a corresponding previous value, and the power manager arranged such that if a current difference value exceeds the maximum difference value, the current value is transmitted.

17. The sensor device of claim 14, wherein the sensor device is arranged to transmit a heartbeat communication to indicate that a monitored component is operating as expected based on received sensor values, and to send frequency domain data if the at least one defined criterion is met.

18. The sensor device of claim 1, comprising at least one further sensor, the data transmission component arranged to transmit at least a portion of sensor data derived from the at least one further sensor.

19. The sensor device of claim 18, wherein the at least one further sensor includes a temperature sensor.

20. A sensor device as claimed in claim 1, wherein the sensor comprises an accelerometer arranged to sense vibrations in 3 mutually orthogonal axes.

21. The sensor device of claim 1, comprising an intrinsically safe switch arranged to control provision of power from a battery to all electrical components of the sensor device.

22. The sensor device of claim 21, wherein the intrinsically safe switch includes a reed switch and a magnet that is receivable in a recess disposed adjacent the reed switch, wherein when the magnet is not received in the recess, the reed switch is closed, and when the magnet is received in the recess, the magnetic force provided by the magnet causes the reed switch to open.

23. A sensor network comprising:
a plurality of sensor devices, each sensor device as recited in claim 1;
a communications network capable of facilitating data transmissions from the data transmission components of the sensor devices; and
a remote facility in network communication with the plurality of sensor devices through the communications network such that the data transmissions from the data transmission components are receivable at the remote facility.

24. A method of sensing an operational characteristic of a component using a sensor device, the method comprising:
disposing the sensor device on the component;
providing the sensor device with a sensor;
controlling the sensor device to produce time domain data representative of a sensed time dependent characteristic adjacent the sensor;
using a signal processing component of the sensor device to produce frequency domain data using the time domain data, the frequency domain data indicative of frequency components present in the time domain data;
controlling provision of power to at least one component of the sensor device according to power management criteria, the power management criteria defining wake up and sleep times whereby power to the at least one sensor device component is caused to be connected during wake time and power to the at least one sensor device component is caused to be disconnected during sleep time; and
during each wake time, the method comprises:
selecting a subset of frequency domain data from the frequency domain data according to the amount of data that can be included in a single data packet; and
using a low-power wide-area network (LPWAN) protocol, transmitting the selected subset of frequency domain data in the single data packet using a data transmission component of the sensor device;
wherein only one data packet is transmitted during each wake time.

25. The method of claim 24, wherein the selected subset of frequency domain data corresponds to a defined number of frequency peaks in the frequency domain data.

26. The method of claim 25, wherein the selected subset of frequency domain data corresponds to a defined number of the highest frequency peaks in the frequency domain data.

27. The method of claim 24, wherein the sensor device is also arranged to transmit other data in addition to the selected subset of frequency domain data.

28. The method of claim 27, wherein the other data includes any one or more of the following:
maximum peak acceleration amplitude;
minimum peak acceleration amplitude;
mean acceleration amplitude;
time domain acceleration crest factor;
frequency domain rms value;
frequency domain positive peak mean value;
frequency domain negative peak mean value;
peak velocity data values derived by integrating the acceleration frequency domain data, for example wherein each velocity value is the or one of several maximum values in a bin of a set of bins; and/or
turning speed of a rotatable part of a component to which the sensor is attached.

29. The method of claim 28, comprising producing time domain vibration, acceleration, velocity and/or displacement data.

30. The method of claim 24, comprising transmitting the subset of the frequency domain data using a long range wide area network (LoRaWAN) protocol.

31. The method of claim 24, comprising storing the time domain data in an external memory and loading the time domain data into the signal processing component for processing.

32. The method of claim 31, comprising loading successive portions of the time domain data into the signal processing component so that the time domain data can be processed in several batches.

33. The method of claim 24, comprising selecting the subset of frequency domain data from a defined frequency band.

34. The method of claim 33, comprising progressively filling a buffer with data until the amount of data in the buffer is sufficient to fill a payload of a data packet used by the data transmission component, and causing the data in the buffer to be sent by the data transmission component when sufficient data is present in the buffer.

35. The method of claim 34, comprising sending the data irrespective of whether there is sufficient data to fill a data packet if at least one defined criterion is met.

36. The method of claim 35, wherein the at least one defined criterion includes a maximum and/or minimum permissible value associated with a sensor, wherein if a current value associated with the sensor exceeds the maximum or minimum value, the current value is transmitted.

37. The method of claim 35, wherein the at least one defined criterion includes a maximum permissible difference value associated with a sensor, the permissible difference value representing a difference amount between a current value and a corresponding previous value, wherein if a current difference value exceeds the maximum difference value, the current value is transmitted.

* * * * *